(12) United States Patent
Lee

(10) Patent No.: US 9,886,151 B2
(45) Date of Patent: Feb. 6, 2018

(54) TOUCH DETECTION SENSOR STRUCTURE OF CAPACITIVE TYPE TOUCH SCREEN PANEL

(71) Applicant: G2TOUCH Co., LTD, Seongnam (KR)

(72) Inventor: Sung Ho Lee, Hwaseong (KR)

(73) Assignee: G2TOUCH CO., LTD, Seongnam (KR)

( * ) Notice: Subject to any disclaimer, the term of this patent is extended or adjusted under 35 U.S.C. 154(b) by 112 days.

(21) Appl. No.: 14/963,721

(22) Filed: Dec. 9, 2015

(65) Prior Publication Data

US 2016/0170530 A1 Jun. 16, 2016

(30) Foreign Application Priority Data

Dec. 10, 2014 (KR) ........................ 10-2014-0177764

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ....... G09G 2310/08; G09G 2320/0271; G09G 2320/064; G09G 2320/0646; G09G 2330/021; G09G 2340/0435; G09G 2360/144; G09G 3/3406; G09G 3/3426; G09G 3/3611; G09G 3/3648; G09G 3/3674; G06F 3/0418; G06F 3/044; G06F 3/016

See application file for complete search history.

(56) References Cited

U.S. PATENT DOCUMENTS

| | | | | |
|---|---|---|---|---|
| 2006/0097991 A1* | 5/2006 | Hotelling | .............. | G06F 3/0416 345/173 |
| 2011/0279169 A1* | 11/2011 | Salaverry | .............. | G06F 3/0416 327/517 |
| 2011/0279409 A1* | 11/2011 | Salaverry | .............. | G06F 3/0416 345/174 |
| 2014/0022186 A1* | 1/2014 | Hong | .................... | G06F 3/0416 345/173 |

FOREIGN PATENT DOCUMENTS

| | | |
|---|---|---|
| KR | 10-2010-0091173 A | 8/2010 |
| KR | 10-2013-0018600 A | 2/2013 |

* cited by examiner

*Primary Examiner* — Saiful A Siddiqui

(57) ABSTRACT

The present invention proposes to solve the problems of the existing capacitive type touch screen panel as described above and an object of the present invention is to differently dispose positions of sensors 10 configuring a touch screen panel in each column or each row, that is, differently disposing touch detection sensors in each column or each row of the touch panel to extract optimal conditions of a separation, thereby more reducing the number of touch sensors 10 compared to a stripe structure which has to reduce a length of a basic sensor to satisfy the same separation conditions.

16 Claims, 9 Drawing Sheets

<PRIOR ART>

<PRIOR ART>

<PRIOR ART>

<PRIOR ART>

<PRIOR ART>

<PRIOR ART>

<PRIOR ART>

<PRIOR ART>

TOUCH DETECTION SENSOR STRUCTURE OF CAPACITIVE TYPE TOUCH SCREEN PANEL

CROSS-REFERENCE TO RELATED APPLICATIONS

This application claims priority from and the benefit of Korean Patent Application No. 10-2014-0177764, filed on Dec. 10, 2014, which is hereby incorporated by reference for all purposes as if fully set forth herein.

BACKGROUND OF THE INVENTION

Field of the Invention

The present invention relates to a touch detection sensor structure of a touch screen panel for detecting a capacitive type touch input by a human finger or a touch input tool having conductive characteristics similar thereto, and more particularly, to a touch detection method for diversifying a sensor structure installed in a touch screen panel to improve a resolution of coordinates detected upon a detection of a touch signal by making a sensor and a touch input tool opposite to each other.

Discussion of the Background

Generally, a touch screen panel is attached on display devices such as a liquid crystal display (LCD), a plasma display panel (PDP), and an organic light emitting diode (OLED), an active matrix organic light emitting diode (AMOLED) and is one of the input apparatuses that generate signals corresponding to positions where objects such as a finger and a pen are touched. The touch screen panel has been used in wide applications such as small portable terminals, industrial terminals, and digital information devices (DIDs).

Typically, various types of touch screen panels have been disclosed. However, a resistive touch screen panel having simple manufacturing process and low manufacturing costs has been most widely used. However, the resistive touch screen panel has the low transmissivity and needs to be applied with a pressure, For this reason, the resistive touch screen panel is inconvenient to use, has a difficulty in implementing a multi touch and a gesture cognition, leads to a detection error, etc.

On the other hand, a capacitive type touch screen panel may have high transmissivity, cognize a soft touch, and implement better multi touch and gesture cognition. As a result, the capacitive type touch screen panel is gradually expanding into new markets.

FIG. 1 illustrates an example of the existing capacitive type touch screen panel. Referring to FIG. 1, transparent conductive layers are formed on upper and lower surfaces of a transparent substrate 2 made of plastic, glass, etc., and voltage applying metal electrodes 4 are formed at each of the four corners of the transparent substrate 2. The transparent conductive layer is made of transparent metals such as indium tin oxide (ITO) and antimony tin oxide (ATO). Further, the metal electrodes 4 formed at four corners of the transparent conductive layer are formed by being printed with conductive metal having low resistivity such as silver Ag. A resistance network is formed around the metal electrodes 4. The resistance network is formed in a linearization pattern to equally send out a control signal to the whole surface of the transparent conductive layer. Further, an upper portion of the transparent conductive layer including the metal electrode 4 is coated with a passivation layer.

In the capacitive type touch screen panel as described above, a high-frequency alternating voltage is applied to the metal electrode 4 and thus is conducted over the whole surface of the transparent substrate 2. In this case, when the transparent conductive layer on an upper surface of the transparent substrate 2 is light touched with a finger 8 or a conductive touch input tool, a change in current is sensed by a current sensor embedded in a controller 6 while a predetermined amount of current is absorbed into a body and current amounts at each of the four metal electrodes 4 are calculated, thereby cognizing touched points.

However, the capacitive type touch screen panel as illustrated in FIG. 1 is based on a method for detecting a magnitude of micro current. As a result, the capacitive type touch screen panel needs an expensive detection apparatus and therefore a price of the capacitive type touch screen panel goes up and the capacitive type touch screen panel is hard to implement a multi touch for cognizing a plurality of touches.

To overcome the above problems, the capacitive type touch screen panel as illustrated in FIG. 2 has been mainly used in recent years. The touch screen panel of FIG. 2 is configured to include a lateral linear sensor 5a, a longitudinal linear sensor 5b, and a touch drive IC 7 analyzing a touch signal. The touch screen panel is based on a method for detecting a magnitude of capacitance formed between the linear sensor 5 and the finger 8 and scans the lateral linear sensor 5a and the longitudinal linear sensor 5b to detect a signal, thereby cognizing the plurality of touched points.

However, when the above-mentioned touch screen panel is installed on a display device such as an LCD, the touch screen panel is hard to detect a signal due to noise. For example, the LCD uses a common electrode to which alternating common voltage Vcom is applied, in some cases. Further, the common voltage Vcom of the common electrode acts as noise upon detecting the touched point.

FIG. 3 illustrates an embodiment in which the existing capacitive type touch screen panel is installed on the LCD. A display device 200 has a structure in which a liquid crystal is sealed between a TFT substrate 205 at a lower portion thereof and a color filter 215 at an upper portion thereof to form a liquid crystal layer 210. To seal the liquid crystal, the TFT substrate 205 and the color filter 215 are bonded to each other by having a sealant 230 disposed at outer portions thereof. Although not illustrated, polarizing plates are attached to upper and lower portions of a liquid crystal panel and back light units (BLUs) are additionally installed at the liquid crystal panel.

As illustrated, the touch screen panel is installed at the upper portion of the display device 200. The touch screen panel has a structure in which the linear sensor 5 is put on an upper surface of the substrate 1. A protection panel 3 for protecting the linear sensor 5 is attached on the substrate 1. The touch screen panel is bonded to an edge portion of the display device 200 by an adhesive member 9 such as a double adhesive tape (DAT), in which an air gap 9a is formed between the touch screen panel and the display device 200.

In this configuration, when a touch is generated as illustrated in FIG. 3, a capacitance such as Ct is formed between the finger 8 and the linear sensor 5. However, as illustrated, a capacitance such as Cvcom is also formed between the linear sensor 5 and the common electrode 200 formed on a lower surface of the color filter 215 of the display device 200 and an unknown parasitic capacitance Cp that occurs due to a capacitance coupling between patterns, manufacturing process factors, etc., is also applied to the linear sensor 5. Therefore, a circuit like an equivalent circuit of FIG. 4 is configured.

Here, the existing touch screen panel detects a variation of Ct to cognize a touch and Cvcom and Cp act as noise upon detecting the Ct.

Typically, to remove the noise, as illustrated in FIG. 3, an air gap 9a is disposed between the touch screen panel and a display device 200. Further, although not illustrated, a lower surface of the substrate 1 of the touch screen panel is coated with ITO, or the like to form a shielding layer and the shielding layer is grounded to a ground signal.

However, due to the air gap 9a, a thickness of products may be increased and a quality of products may deteriorate. Further, a separate shielding layer and a manufacturing process for forming the shielding layer are required and therefore manufacturing costs may be increased. In particular, when the touch screen panel built in the LCD, the air gap 9a or the shielding layer may not be formed. Therefore, the touch screen panel may not be manufactured to be built in the display devices such as the LCD.

To solve the above problems, the touch detection method as illustrated in FIG. 5 is proposed. Referring to FIG. 5, a sensor of FIG. 5 is not the linear sensor as illustrated in FIG. 2 but is configured of only one sensor 10. The sensor is connected to point P which is a touch detector, and applies a driving voltage through an auxiliary capacitor Caux connected to the point P and when the touch capacitance Ct is applied between the sensor 10 and the touch input tool, uses the phenomenon that a difference in magnitude in voltage or current detected by the touch detector depending on the magnitude in the touch capacitance occurs, thereby detecting a touch signal. The detection method detects noise occurring in the display device such as the LCD and detects the touch signal while avoiding the occurrence timing of the noise to detect the touch signal independent of the noise. Alternatively, since a size of the noise detected by one sensor as illustrated in FIG. 5 is smaller than that of the noise detected by a plurality of interconnected sensors as illustrated in FIG. 2, the touch signal may be detected while being less sensitive to noise in a touch screen panel structure as illustrated in FIG. 6.

FIG. 5 illustrates an embodiment of a configuration of one sensor and the touch screen panel configured of a plurality of sensors is configured as illustrated in FIG. 6. Referring to FIG. 6, a configuration of a touch IC 30 is illustrated at a lower portion of FIG. 6. The touch IC 30 may include a driver 31 including a multiplexer, a touch detector 14, a timing controller 33, a signal processor 35, and a memory unit 28 and may further include a power supply unit 47, a communication unit 46, and a CPU 40.

The touch signal or the touch coordinate detected by the touch IC 30 is transferred to the CPU 40. The CPU 40 may be a CPU of the display device, a main CPU of a computer device, or a CPU of the touch screen panel itself. For example, the CPU may have a 8-bit microprocessor, 16-bit microprocessor, etc., embedded therein to process the touch signal.

The microprocessor embedded in the touch IC 30 may operate the coordinates input by the touch to cognize gestures such as a touch point, a zoom, a rotation, and a move and transfer data such as a reference coordinate (or central point coordinate) and gestures to the main CPU. Further, the microprocessor may process data in various ways such as generating a zooming signal by operating an area of the touch input, calculating strength of the touch input, and cognizing only a user's desired (for example, large-area detected) GUI object as an effective input when a plurality of GUI objects are simultaneously touched and output the processed data.

A timing controller 33 generates a time division signal less than tens of ms and the signal processor 35 transmits and receives signals to and from each sensor 10 through the driver 31. The driver 31 supplies an on/off control signal Vg of a charging means 12 and a precharge signal Vpre. The on/off control signal Vg is time-divided by the timing controller 33 to be sequentially or non-sequentially supplied to each sensor 10. The memory unit 28 is to store an initial value which is a signal when a touch is not generated at each sensor 10 or is to store a signal when a touch is generated and has unique absolute addresses for each sensor 10.

As such, the memory unit 28 may include only one memory means to temporarily store acquired coordinate values or a reference value when the touch is not generated. Alternatively, the memory unit 28 may include a plurality of memory means to separately store the reference value when the touch is not generated and a detection value when the touch is generated.

The embodiment illustrated in FIG. 6 illustrates the case in which sensor 10 has a resolution of 6 rows*5 columns, which is only an embodiment. Actually, the sensor 10 has a higher resolution, that is, has a larger number of sensors in a row and a larger number of sensors in a column. For example, a case in which the sensor has a resolution of 20×20 may be expected.

FIG. 7 is an embodiment of a touch screen panel installed on an upper surface of the display device 200. As illustrated in FIG. 7, the display device 200 has the common electrode 200. An AMOLED does not have a common voltage with a function to display an image quality. However, a virtual potential layer in which the common electrode capacitance Cvcom may be formed is formed between a TFT substrate and the sensor 10, which is also called the common electrode. The display device 200 may be various types of display devices as described above and the common electrode 220 may be a Vcom electrode of the LCD or other types of electrodes. An embodiment of FIG. 10 illustrates an LCD among the display devices.

The display device 200 illustrated in FIG. 7 has a structure in which a liquid crystal is sealed between a TFT substrate 205 at a lower portion and a color filter 215 at an upper portion to form a liquid crystal layer 210. To seal the liquid crystal, the TFT substrate 205 and the color filter 215 are bonded to each other by having a sealant 230 disposed at outer portions thereof. Although not illustrated, a polarizer is attached to the upper and lower portions of the liquid crystal panel. In addition, optical sheets configuring a back light unit (BLU) and a brightness enhancement film (BEF) may be installed like the BLU.

As illustrated, the substrate 50 of the touch screen panel is installed on the display device 200. As illustrated in FIG. 7, the substrate 50 has an outer portion attached on the display device 200 by an adhesive member 57 such as a double adhesive tape (DAT). Further, an air gap 58 is formed between the substrate 50 and the display device 200.

A common voltage level which is a DC alternating at a predetermined frequency and having a varying or constant magnitude is applied to the common electrode 220 of the display device 200. For example, in a small LCD with a line inversion, the common voltage of the common electrode 220 alternates as illustrated in FIG. 5 and in the LCD such as a notebook and a monitor/TV with a dot inversion, the common voltage having a DC level which is a voltage having a predetermined magnitude is applied.

As illustrated, the common electrode capacitance Cvcom is formed between the sensor 10 and the common electrode 220 of the display device 200. If any precharge signal is applied to the sensor 10, the common electrode capacitance Cvcom has a predetermined voltage level by a charging voltage. In this case, one end of the common electrode capacitance Cvcom is grounded to the common electrode 220, such that when the common electrode 220 is an alternating voltage, a potential at the sensor 10 which is the other terminal of the common electrode capacitance Cvcom alternates due to the alternating voltage applied to the common electrode 220 and when the common electrode is a DC, the potential at the sensor 10 does not alternate.

Meanwhile, non-explained reference numeral 24 in the drawings is a passivation layer 24 for protecting the sensor 10.

In the structure, the touch signal is detected at point P of FIG. 5, that is, the touch detector 14 by the following Equations.

$$\Delta Vsensor = \pm(Vh - Vl)\frac{Caux}{Caux + Cvcom + Cp} \quad \langle \text{Equation 1} \rangle$$

$$\Delta Vsensor = \pm(Vh - Vl)\frac{Caux}{Caux + Cvcom + Cp + Ct} \quad \langle \text{Equation 2} \rangle$$

(In the above Equations, ΔVsensor represents the touch signal detected by the touch detector 14, Vh represents a high level voltage applied to the auxiliary capacitor, Vl represents a low level voltage applied to the auxiliary capacitor, Caux represents an auxiliary capacitor capacitance, Cvcom represents the common electrode capacitance, Cp represents the parasitic capacitance, and Ct represents the touch capacitance.

Referring to the above <Equation 1> and <Equation 2>, the above <Equation 1> represents the touch signal detected by the touch detector 14 when the touch is not made and the above <Equation 2> represents the touch signal detected by the touch detector 14 when the touch is made by a finger, that is, when the finger and the sensor 10 are opposite to each other. The difference between the above <Equation 1> and <Equation 2> is a difference on whether the Ct which is the touch capacitance is present in a denominator. In this case, when the touch capacitance Ct is generated by the touch, amplitude of a signal detected depending on the above <Equation 2> is changed due to the magnitude of the generated touch capacitance Ct. Therefore, it is possible to detect the amplitude of the touch signal by operating the changed signal amplitude.

The touch signal detected by each sensor 10 based on the difference between the above <Equation 1> and <Equation 2> is transferred to the CPU 40 or the signal processor 35 discriminate whether the touched finger (conductor, hereinafter, referred to as an object) is one, two, or more and then operate the touch coordinate. When the object is touched to the sensors 10 a lot farther away from each other, it is not difficult to differentiate the number of touched objects. However, it is difficult to differentiate how many objects are present in a state in which the plurality of objects are touched to one sensor 10 or are touched to adjacent sensors.

FIG. 8 is the existing embodiment for discriminating the number of objects. FIG. 8 illustrates a state in which four (sensor A 801, sensor B 802, sensor C 803, and sensor D 804) sensors 10 are present in one column and a multi-touch (touch 1, touch 2) by two objects is performed.

It is assumed that the touch of the upper portion by any object is called "touch 1" and a touch of the lower portion by any object is called "touch 2". Further, a longitudinal length of each sensor is assumed to be "d". FIG. 8 is a diagram illustrating an example of a worst case on the discrimination (hereinafter, separation) of two objects in the touch panel. In the sensor 10 illustrated in FIG. 8, if the sensor A 801/sensor B 802/sensor C 803 are disposed from above and the sensor D 804 is disposed at a lowermost portion, the multi-touch in which the two objects are touched to four sensors 10 is made. The "touch 1" is in a state in which the sensor A and the sensor B are each touched at an area share of 50% and the "touch 2" is also in a state in which the sensor C and the sensor D are each touched at an area share of 50%.

Therefore, the amplitudes of the touch signals detected in each area are the same, which is a case (case 1) 810 in which the separation is impossible since the amplitudes of the signals are the same when looking at the amplitudes of the signals displayed at a center of FIG. 8. A distance between the respective central points of the touch 1 and the touch 2 is 2d, when an interval between the objects is larger than 2d (distance between the respective central points), the touch area of the sensor A or the sensor D is increased and the touch area of the sensor B or the sensor C is reduced and therefore two vertexes are detected like the amplitudes of the touch signals illustrated in the right of FIG. 8, such that the separation may be made (case 2) 820.

As illustrated in FIG. 6, the form in which the sensors 10 are regularly disposed at up, down, left, and right sides is called a stripe structure (hereinafter, stripe). The interval between the sensors 10 required for the separation of the objects in a column direction or a row direction in the stripe structure is 2d in the embodiment of FIG. 8. The interval between the sensors 10 required for the separation of the objects is 2d, and therefore the number of sensors 10 (since a basic length of the sensors needs to be reduced) required to maintain the interval between the sensors for the separation at 1d or 1.5d is increased, such that the touch IC 30 may be increased and prices may be increased.

SUMMARY OF THE INVENTION

The present invention proposes to solve the problems of the existing capacitive type touch screen panel as described above and an object of the present invention is to reduce the number of touch sensors 10 by differently disposing positions of the sensors 10 configuring a touch screen panel in each column or each row, that is, by differently disposing the touch detection sensors in each column or each row of the touch panel to extract optimal conditions of a separation.

As described above, a characteristic configuration of present invention is as follows for achieving the above objects of the present invention and specific effects of the present invention.

According to an exemplary embodiment of the present invention, there is provided a touch detection sensor structure of a touch screen panel including a plurality of touch detection sensors generating a touch capacitance by an approach of a conductor, including: a plurality of touch detection sensors of a first row or a first column having a predetermined width and a predetermined height; and a plurality of touch detection sensors of a second row or a second column having the same width and height as the touch detection sensor of the first row or the first column, in which the touch detection sensors of the second row or the second column are disposed to mismatch the touch detection sensors of the first row or the first column by a predetermined offset.

Both ends of the second row or the second column may be provided with the plurality of touch detection sensors having a different width from the width or a different height from the height.

The offset may be 50% and one of the touch detection sensors of the second row or the second column may mismatch two successively disposed touch detection sensors of the touch detection sensors of the first row or the first column by a half in terms of a height or a width to form a delta ($\Delta$) structure.

The offset may be 33.3% and one of the touch detection sensors of the second row or the second column may mismatch two successively disposed touch detection sensors of the touch detection sensors of the first row or the first column by 1/3 and 2/3 or 2/3 and 1/3 in a height or a width to form a delta ($\Delta$) structure.

When a plurality of touch capacitances are generated throughout the first row and the second row by the two conductors, a multi-touch by the conductor may be detected based on the smaller one of a distance between centers of the two touch capacitances generated in the first row and a distance between centers of the two touch capacitances generated in the second row to increase a detection resolution of a touch coordinate.

When a plurality of touch capacitances are generated throughout the first column and the second column by the two conductors, a multi-touch by the conductor may be detected based on the smaller one of a distance between centers of the two touch capacitances generated in the first column and a distance between centers of the two touch capacitances generated in the second column to increase a detection resolution of a touch coordinate.

Upper and lower edges or left and right edges of the touch screen panel may be further provided with the touch detection sensors having a stripe structure without the offset by at least one column or at least one row.

The touch detection sensors of the first row or the first column and the touch detection sensors of the second row or the second column may be repeatedly disposed in a column direction or a row direction and as the touch detection sensors are repeatedly disposed, an order of the touch detection sensors may be changed.

According to another exemplary embodiment of the present invention, there is provided a touch detection sensor structure of a touch screen panel including a plurality of touch detection sensors generating a touch capacitance by an approach of a conductor, including: a plurality of touch detection sensors of a first row or a first column having a predetermined width and a predetermined height; a plurality of touch detection sensors of a second row or a second column having the same width and height as the touch detection sensor of the first row or the first column; and a plurality of touch detection sensors of a third row or a third column having the same width and height as the touch detection sensor of the first row or the first column, in which the touch detection sensors of the second row or the second column are disposed to mismatch the touch detection sensors of the first row or the first column by a first offset and the touch detection sensors of the third row or the third column are disposed to mismatch the touch detection sensors of the first row or the first column by a second offset.

Both ends of the second row or the second column and both ends of the third row or the third column may be provided with the plurality of touch detection sensors having a different width from the width or a different height from the height.

The first offset may be 50% and one of the touch detection sensors of the second row or the second column may mismatch two successively disposed touch detection sensors of the touch detection sensors of the first row or the first column by a half in terms of a height or a width to form a delta ($\Delta$) structure.

The second offset may be 33.3% and one of the touch detection sensors of the third row or the third column may mismatch two successively disposed touch detection sensors of the touch detection sensors of the first row or the first column by 1/3 and 2/3 or 2/3 and 1/3 in a height or a width to form a delta ($\Delta$) structure.

When a plurality of touch capacitances are generated throughout the first row and the second row by the two conductors, a multi-touch by the conductor may be detected based on the smaller one of a distance between centers of the two touch capacitances generated in the first row and a distance between centers of the two touch capacitances generated in the second row to increase a detection resolution of a touch coordinate.

When a plurality of touch capacitances are generated throughout the first column and the second column by the two conductors, a multi-touch by the conductor may be detected based on the smaller one of a distance between centers of the two touch capacitances generated in the first column and a distance between centers of the two touch capacitances generated in the second column to increase a detection resolution of a touch coordinate.

When a plurality of touch capacitances are generated throughout the second row and the third row by the two conductors, a multi-touch by the conductor may be detected based on the smaller one of a distance between centers of the two touch capacitances generated in the second row and a distance between centers of the two touch capacitances generated in the third row to increase a detection resolution of a touch coordinate.

When a plurality of touch capacitances are generated throughout the second column and the third column by the two conductors, a multi-touch by the conductor may be detected based on the smaller one of a distance between centers of the two touch capacitances generated in the second column and a distance between centers of the two touch capacitances generated in the third column to increase a detection resolution of a touch coordinate.

Upper and lower edges or left and right edges of the touch screen panel may be further provided with the touch detection sensors having a stripe structure without the offset by at least one column or at least one row.

The touch detection sensors of the first row or the first column, the touch detection sensors of the second row or the second column, and the touch detection sensors of the third row or the third column may be repeatedly disposed in a column direction or a row direction and as the touch detection sensors are repeatedly disposed, an order of the touch detection sensors may be changed.

DETAILED DESCRIPTION OF THE ILLUSTRATED EMBODIMENTS

Figure 1:
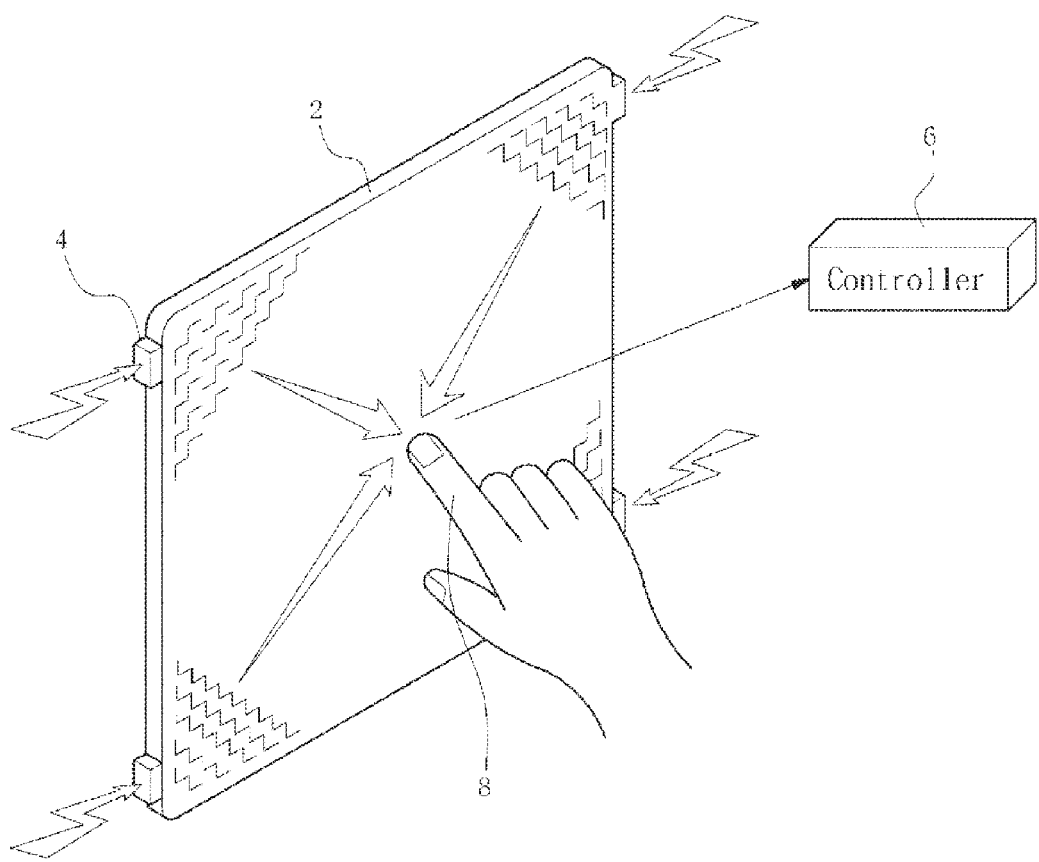
FIG. 1 is a perspective view illustrating an example of the existing touch screen panel.

In order to sufficiently understand the present invention, operational advantages of the present invention, and objects accomplished by exemplary embodiments of the present invention, the accompanying drawings showing exemplary embodiments of the present invention and contents described in the accompanying drawings should be referred.

Hereinafter, exemplary embodiments of the present invention will be described in detail with reference to the accompanying drawings. Like reference numerals proposed in each drawing denote like components.

Hereinafter, exemplary embodiments of the present invention will be described in detail with reference to the accompanying drawings.

First, the present invention relates to a touch screen panel having sensors 10 disposed to mismatch each other. Meanwhile, the existing touch screen panel to which a stripe pattern is applied cannot help detecting a separation only in a worst case all the time but the present invention relates to a touch screen panel capable of extracting only optimal separation conditions by a new structure proposed in the present invention called a delta structure.

A display device described in the present invention means any one of LCD, PDP, OLED, and AMOLED and means all means displaying other images. Among the display devices listed above, the LCD requires a common voltage Vcom to drive a liquid crystal. For example, a small and medium portable LCD uses a line inversion scheme in which a common voltage of a common electrode alternates in one line or each of the plurality of gate lines, to thereby reduce current consumption. As another example, a large LCD has a DC level at which a common voltage of a common electrode is constant. As still another example, in any display device, a shielding electrode commonly acting throughout the whole of the panel is formed to cut off external ESD and the formed shielding electrode is grounded to a ground signal. Alternatively, in an in-plane switching mode LCD, the common electrode is positioned on a TFT substrate and a common voltage detected on an upper surface of a color filter vertically alternates at an unspecific frequency based on a DC level.

According to the exemplary embodiment of the present invention, in addition to the electrode to which the common voltage Vcom is applied as described above, all electrodes commonly acting within the display device are referred to as the "common electrode" and an alternating voltage or a DC voltage applied to the common electrode of the display device or a voltage alternating at a unspecific frequency is referred to as the "common voltage".

The present invention detects a non-contact touch input of a finger or a touch input tool having electrical characteristics similar thereto. Here, the "non-contact touch input" means that the touch input tool such as a finger performs the touch input in a state in which the touch input tool is spaced apart from a sensor at a predetermined distance, by a substrate disposed therebetween. The touch input tool may contact an outer surface of the substrate. However, even in this case, the touch input tool and the sensor are maintained in the non-contact state. Therefore, a touch behavior of a finger to the sensor may be expressed by the term "approach" Meanwhile, since the finger comes into contact with the outer surface of the substrate, the touch behavior of the finger to the substrate may be expressed by the term "contact". In the present specification, the "approach" and the "contact" are commonly used as described above.

Further, components like "~unit" to be described below are components playing any roles and mean software or hardware components like a field-programmable gate array (FPGA) or an application specific integrated circuit (ASIC). Further, the "~unit" may be included in an upper-level component or another "~unit" or may include lower-level components and "~units". Further, the "~unit" itself may also have a standalone CPU.

In the following drawings, to clearly represent layers and regions, a thickness or a region is exaggerated in the drawings. Like reference numerals designate like elements throughout the specification. It will be understood that when an element such as a layer, a region, a substrate is referred to as being "on" another element or an "upper surface", it may be "directly on" another element or may have an intervening element present therebetween. In contrast, the meaning that an element is "directly on" another element is that there are no intervening elements therebetween. Further, a signal described in the present specification is collectively referred to as a voltage or a current unless specially indicated.

A meaning of "separation" in the present invention illustrates discrimination on two objects in a touch panel but it may be appreciated by those skilled in the art that the present invention is not necessarily limited to the two objects and therefore does not exclude three or four multi-touches.

The "delta structure" in the present invention means a specific shape of an arrangement of touch detection sensors in the touch panel and has a shape of a "delta Δ" if three touch detection sensors adjacent to one another in each row or each column are connected to one another (FIGS. 10 to 13).

Figure 6:
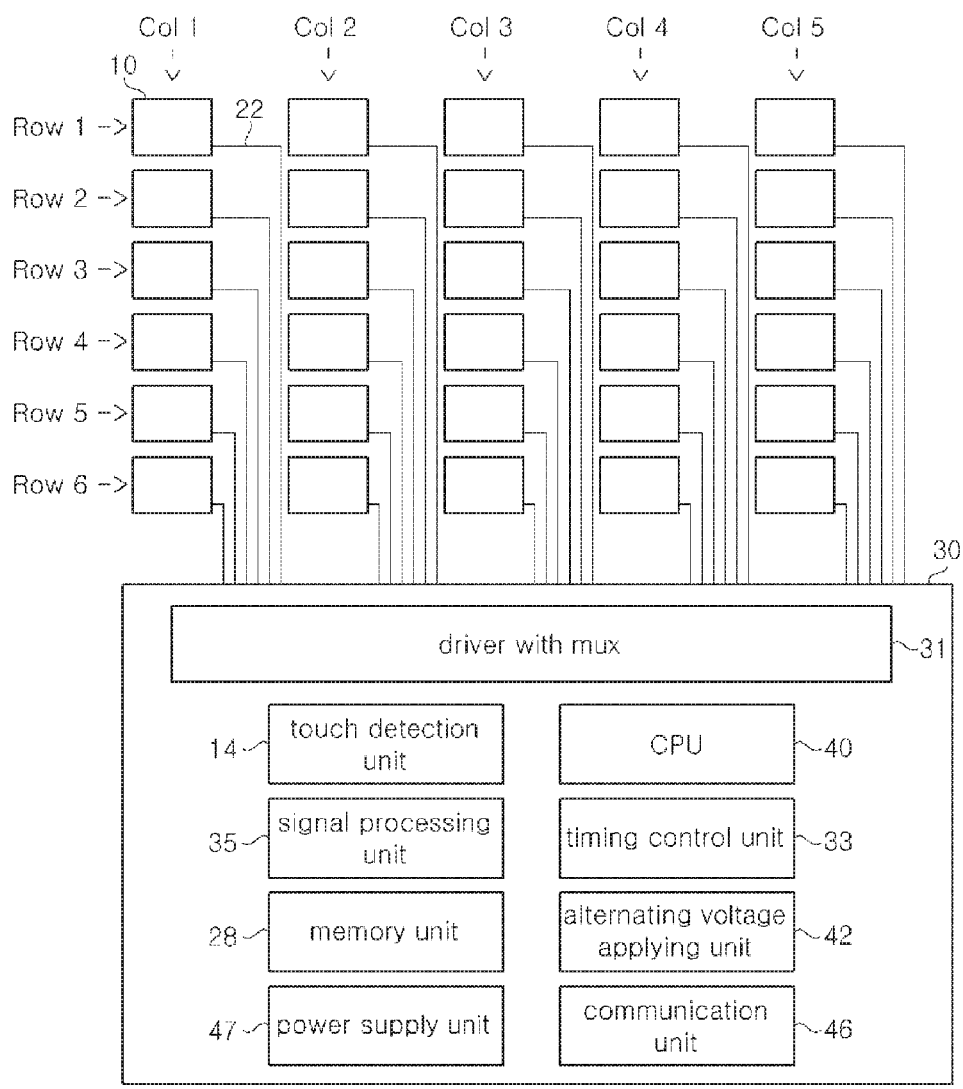
FIG. 6 is a diagram illustrating an embodiment of the touch screen panel configured to include a touch drive IC 30 detecting a touch and a plurality of sensors illustrated in FIG. 5.
Figure 7:
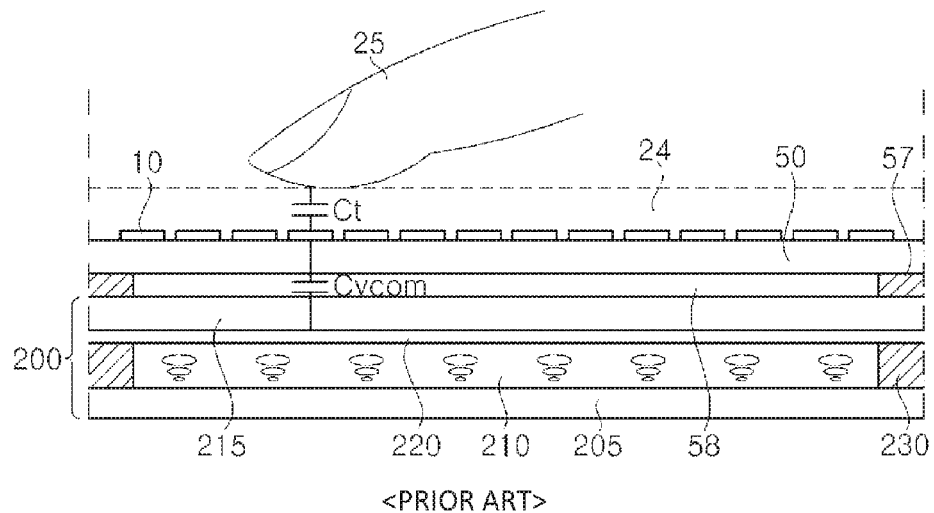
FIG. 7 is an embodiment of the touch screen panel installed on an upper surface of a display device 200.

A "stripe structure" in the present invention means a stripe shape in which all the rows and columns of the touch panel are disposed at the same position (FIG. 6).

Figure 9:
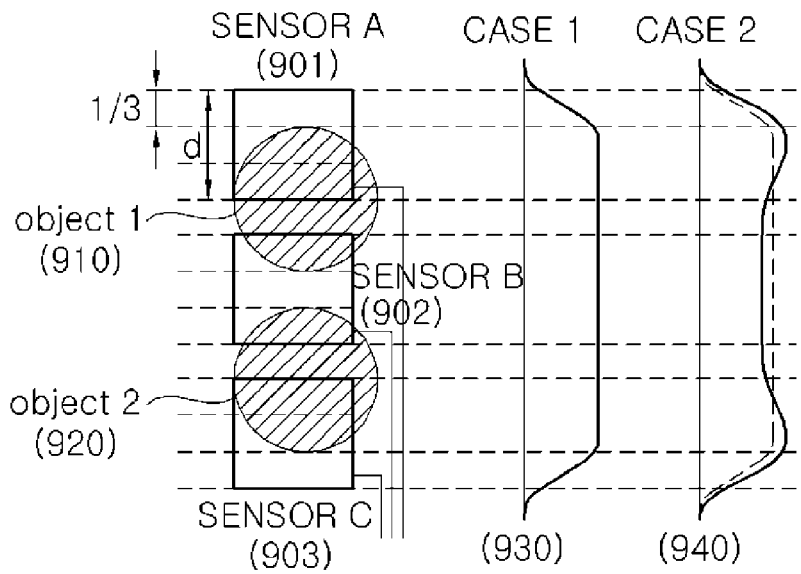
FIG. 9 is an embodiment of a delta structure satisfying optimal separation conditions in sensors 10 disposed at upper and lower sides or left and right sides, as the embodiment of the present invention.

FIG. 9 is an embodiment of a case satisfying optimal separation conditions in sensors 10 disposed at upper and lower sides or left and right sides, as the embodiment of the present invention.

Referring to FIG. 9, two objects are disposed in three sensors 10, sensor A to sensor C. FIG. 9 illustrates, as an embodiment, a case in which vertically disposed sensors, that is, the sensors 10 disposed in the same column are adjacent to each other but the present patent is identically applied to sensors disposed at left and right sides, that is, sensors disposed at the same row.

The present invention describes, for example, touch signals detected by the sensors disposed at upper and lower sides, that is, sensors disposed in the same column but the same technical idea may be identically applied even to the sensors 10 adjacently disposed to each other in the same row.

FIG. 9 illustrates the embodiment of the present invention of a separation in the best case (optimal case). Referring to FIG. 9, three sensors A, B, and C are each divided into three and ⅔ of a detection (area detection) of a touch signal by an upper object 910 is detected by sensor A 901 and ⅓ of the detection is detected by sensor B 902. Further, it is assumed that ⅓ of the detection by a lower object 920 is detected by the sensor B 902 and ⅔ of the detection is detected by the sensor C 903.

The sensor B 902 detects ⅓ of the touch area by the upper object 910 and detects ⅓ of the touch area by the lower object 920, such that ⅔ of the touch area is detected on the whole.

The area detected by the sensor A and the sensor C is ⅔, such that the areas detected by the sensor A 901, the sensor B 902, and the sensor C 903 all are the same as ⅔. Therefore, if this case is case 1 930, like the signal of the case 1 illustrated in FIG. 9, the amplitudes of the signals detected by all the sensors 10 are the same.

In this case, an interval between the respective central points of the upper object 910 and the lower object 920 becomes "⅔*d" and it is possible to detect the separation (that is, determination on whether the two objectors are touched) from the case in which the two objects are wider than ⅔d. Compared to FIG. 8, timing when the interval between the respective touch areas in three sensors becomes ⅔ becomes a boundary point for the separation of the two objects.

Figure 5:
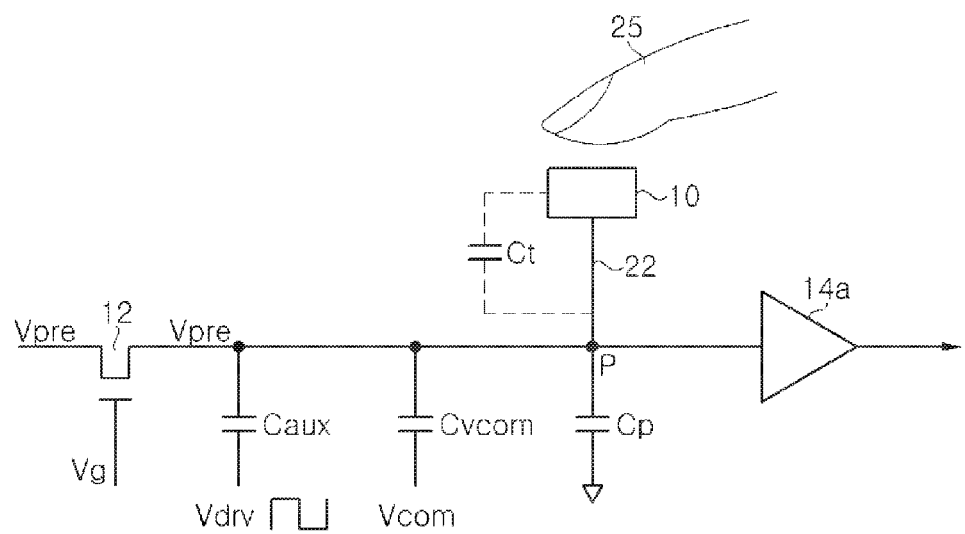
FIG. 5 is a diagram illustrating an embodiment of a method for reducing a common voltage Vcom in the touch screen panel.

Detecting the touch signal in the present invention means detecting the size of the area. The meaning that the touch capacitance Ct of FIG. 5 is in proportion to the area and the touch is detected by the difference between the above Equations 1 and 2 is that the size of the difference between the above Equations 1 and 2 is changed depending on the presence or absence of the Ct added to the denominator of the above equation 2 and the size of the Ct. The meaning that the Ct is in proportion to the touch area and therefore the touch signal is detected, that is, the difference between the above Equations 1 and 2 is detected is the same as the meaning that the touch area touched by the object is detected.

Referring back to FIG. 9, if the upper object 910 and the lower object 920 vertically move by a predetermined position, the area touched by the sensor B while the areas of the sensor A and the sensor C are increased is rapidly reduced due to the reduction effect of the area by the upper object and the reduction effect of the area by the lower object. In the case of case 2, a form of a signal 940 of the case 2 at the right of FIG. 9 will be described.

Referring to the signal 940 of the case 2 illustrated at the right of FIG. 9, a boundary condition of the separation, that is, the case in which a touch is made by ⅔ of an area of each sensor is represented by a dotted line, which is the case of the case 1. If the two objects at the upper and lower portions generate a predetermined displacement, the areas of the sensor A and the sensor C are increased, such that the amplitudes of the touch signals detected by the sensor A and the sensor C are increased. As a result, referring to the case 2, the amplitudes of the signals detected by the sensor A and the sensor C are increased and the amplitude of the signal detected by the sensor B is relatively reduced.

Accordingly, two vertexes are detected and therefore it may be detected that the two objects are touched by the area difference. In other orders, the separation conditions may be satisfied.

Figure 8:
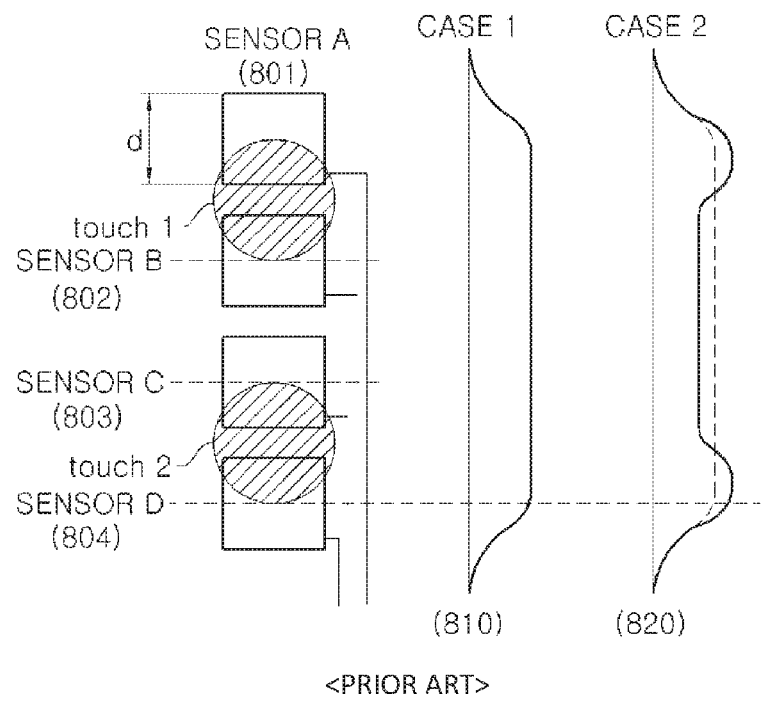
FIG. 8 is an embodiment for identifying a multi-touch by two objects in the touch panel.

FIG. 8 illustrates a worst case of the separation for the same object and FIG. 9 illustrates the best case of the separation. In the stripe structure as illustrated in FIG. 6, the separation by the two objects cannot help designing the touch screen panel in consideration of the worst case since there are the best case and the worst case.

However, if the best case and the worst case are simultaneously detected and only the best case among the best case and the worst case is extracted, it is possible to save the number of sensors 10 by ⅓ under the same separation condition. For this reason, to satisfy the same separation conditions in the touch screen panel having the existing stripe structure, not the delta structure of the present invention, the length of the basic sensor needs to be small, such that the number of sensors may be increased. However, to satisfy the same separation structure in the touch screen panel having the delta structure of the present invention, the length of the basic sensor need not be small, such that the number of sensors may be reduced.

Figure 10:
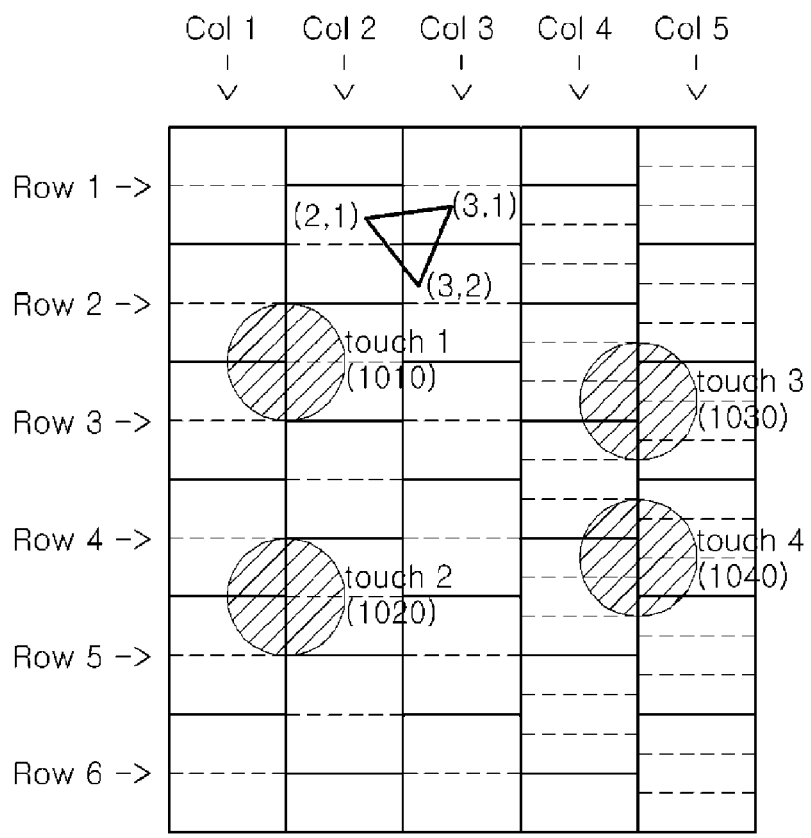
FIG. 10 is a diagram illustrating another embodiment of the delta structure satisfying the separation conditions according to an embodiment of the present invention.

FIG. 10 illustrates the embodiment of the present invention in which the best case and the worst case coexist and only the best case among the best case and the worst case is extracted all the time.

Figure 2:
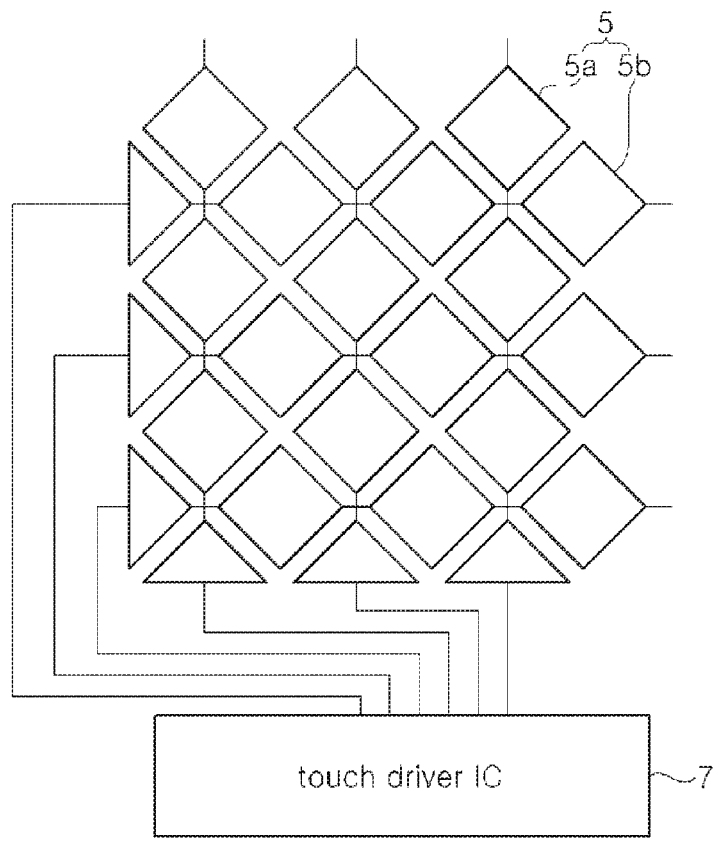
FIG. 2 is a plan configuration diagram illustrating another example of the existing touch screen panel.
Figure 3:
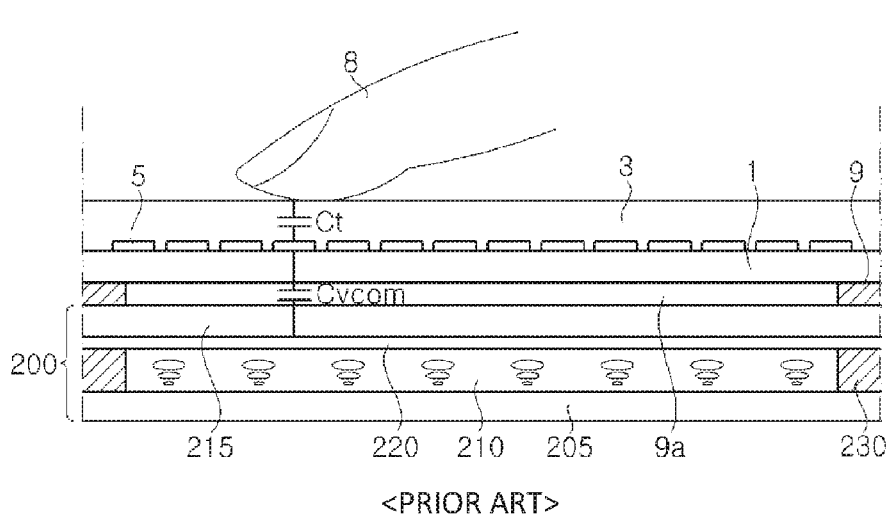
FIG. 3 is a cross-sectional view illustrating an example in which the touch screen panel of FIG. 2 is installed on a display device.
Figure 4:
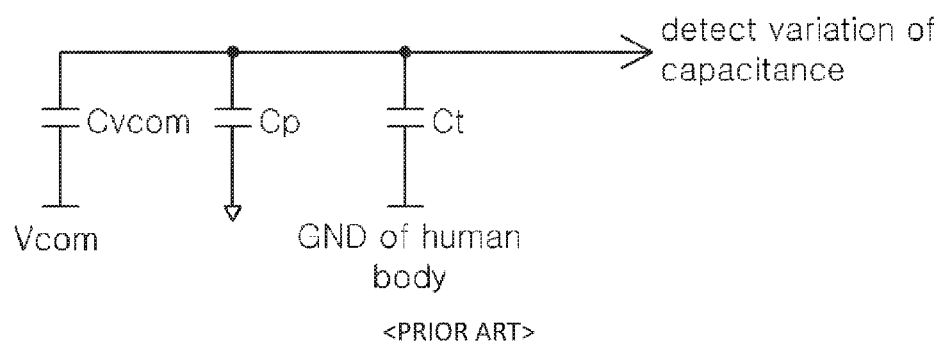
FIG. 4 is an equivalent circuit diagram detecting a touch capacitance in FIG. 3.

The present invention according to the embodiment of FIG. 10 is similar to the delta structure illustrated in upper portions of column 2 and column 3 and therefore is called the delta structure "Δ". Referring to FIG. 10, three touch detection sensors of (2,2), (3,1) and (3,2) are combined to form "Δ", and therefore the structure of the touch detection sensor according to the present invention is called the delta structure, which is compared to the existing stripe structure illustrated in FIG. 2 or FIG. 6.

The present invention relates to the touch detection sensor structure of the touch screen panel including the plurality of touch detection sensors generating the touch capacitances by an approach of conductors including a finger, etc.

In particular, the present invention is to increase the coordinate resolution of the multi-touch.

The touch detection sensor structure according to an embodiment of the present invention includes a plurality of touch detection sensors (col 1 of FIG. 10) of a first column having a predetermined width and a predetermined height and a plurality of touch detection sensors (col 2) of a second column having the same width and height as those of the touch detection sensor of the first column, in which the touch detection sensor of the second column mismatches the touch detection sensor of the first column by a predetermined offset.

Figure 13:
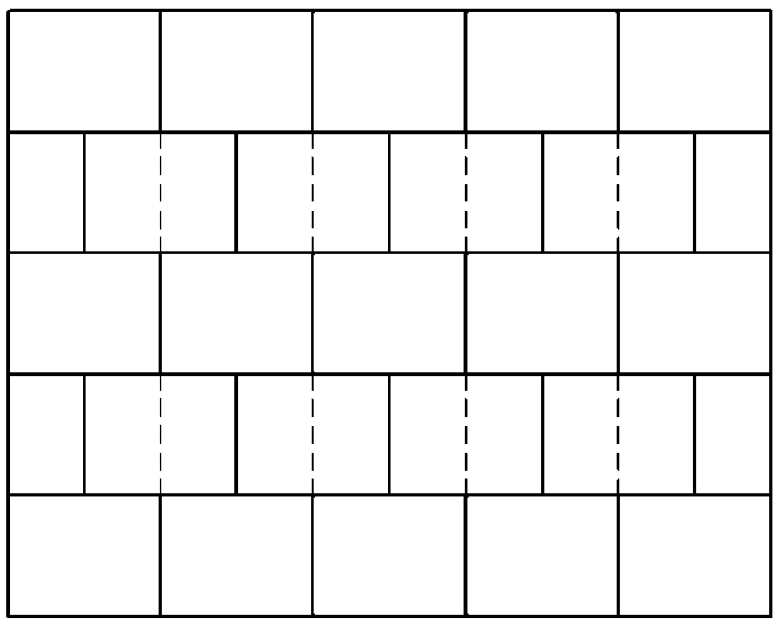
FIG. 13 is a diagram illustrating an embodiment in which the delta structure satisfying the separation conditions according to an embodiment of the present invention is disposed in a row direction of the touch screen panel.

The embodiment of FIG. 10 illustrates an embodiment having the delta structure based on a column unit but the embodiment of FIG. 13 illustrates an embodiment having the delta structure based on a row unit.

The plurality of touch detection sensors are disposed so that the touch detection sensor (hereinafter, marked by the touch detection sensor of (2,1)) of the first row of the second column, the touch detection sensor of (2,6), the touch detection sensor of (4,1), and the touch detection sensor of (4,6) are disposed to have different heights from the touch detection sensor of (2,2) to the touch detection sensor of (2,5). In FIG. 10, the touch detection sensor of (2,1), the touch detection sensor of (2,6), the touch detection sensor of (4,1), and the touch detection sensor of (4,6) have a height of ½ of the touch detection sensor (2,2) and thus are disposed to have a size of ½ in an area.

In the touch screen panel, the touch detection sensors need to be disposed in the whole of an active region, that is, a region in which a screen image is displayed. However, FIG. 10 illustrates five columns and six rows to simplify the arrangement of the touch detection sensors.

However, the touch detection sensors of the first column and the touch detection sensors of the second column may be repeatedly disposed in the column direction and differently from one illustrated in FIG. 10, as the touch detection sensors are repeatedly disposed like the touch detection sensors of the first column→the touch detection sensors of the second column→the touch detection sensors of the second column→the touch detection sensors of the first column, it is apparent to those skilled in the art that the change in an order thereof is also within the scope of the present invention.

The degree that the touch detection sensors of the first column and the touch detection sensors of the second column mismatch each other is called an offset in the present invention.

In FIG. 10, the offset is 50% and the touch detection sensors of the second column mismatches the touch detection sensors of the first column by a half in terms of a height to form the delta (Δ) structure.

That is, in the delta structure, odd columns (columns 1, 3, and 5) and even columns (columns 2 and 4) mismatch each other and the mismatched degree thereof is 50%. The meaning that the mismatched degree is 50% is that adjacent sensors at a point where the area is 50% of the sensors included in the odd columns or the even columns start. The two sensor structures mismatching each other like an even number and an odd number may be acquired under the mismatched situation of 50%.

Figure 11:
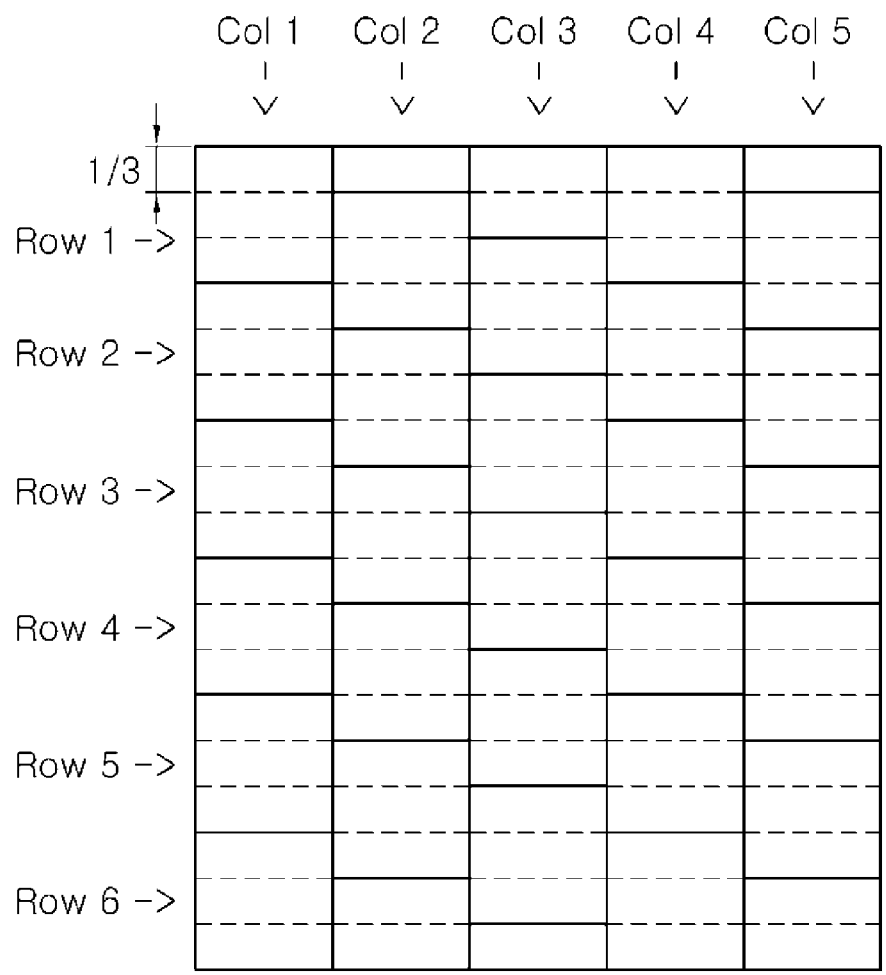
FIG. 11 is a diagram illustrating still another embodiment of the delta structure satisfying the separation conditions according to an embodiment of the present invention.

The 50% may configure the three sensors mismatching one another if ⅓, that is, 33.3% is mismatched like the embodiment of FIG. 11. As described below, it is possible to extract the separation having more precision resolution by making the mismatched degree different. The touch detection sensor involved to extract the separation becomes smaller.

Referring to the delta structure according to the embodiment of the present invention of FIG. 10, the two objects are touched to column 1 and column 2. The touch signal detected in the column 1 is the worst case as described above in the embodiment of FIG. 8.

However, referring to the column 2, the worst case is farther away from a minimum condition ⅔d for applying the best case illustrated in FIG. 9. In other words, the worst case in the column 1 is farther away from the best case in the column 2, which means that referring to FIG. 2, the two objects are narrower.

Column 4 and column 5 of FIG. 10 are an embodiment in this case. The two objects touched to the column 4 satisfy the best case as described in the embodiment of FIG. 9. However, the boundary condition in the worst case by four sensors may not be satisfied in the column 5 by the same object and therefore it is impossible to extract the separation. If the interval between the two objects is narrow up to the distance of the column 5 from the boundary condition in the worst case illustrated in the column 1, it is possible to extract the separation by the best case like the column 4.

Therefore, for the separation, the worst case of 2d may not be maintained but the best case of ⅔*d may be maintained, such that the delta structure may save the number of touch sensors 10 by ⅓ compared to the stripe structure reducing the length of the basic sensor to satisfy the same separation conditions. Reducing the number of touch sensors 10 makes the area of the touch IC 30 small, which may minimize the costs of the touch IC 30, thereby more economically manufacturing the touch screen panel.

As described above, according to the embodiment of the present invention, the sensors 10 are disposed to mismatch each other to extract only the best case related to the separation, thereby saving the number of touch sensors 10.

The touch screen panel having the delta structure according to the present invention detects the multi-touch by the conductor based on the smaller one of a distance between centers of the two touch capacitances generated in the first column and a distance between centers of the two touch capacitances generated in the second column to increase a detection resolution of a touch coordinate, when the plurality of touch capacitances are generated throughout the first column and the second column by the two conductors.

FIG. 11 illustrates an embodiment of the touch detection sensor structure disposed to have an offset of 33.3% according to the present invention.

The touch detection sensor structure according to an embodiment of the present invention includes a plurality of touch detection sensors (col 1 of FIG. 11) of a first column having a predetermined width and a predetermined height and a plurality of touch detection sensors (col 2) of a second column having the same width and height as those of the touch detection sensor of the first column, in which the touch detection sensor of the second column mismatches the touch detection sensor of the first column by a predetermined offset.

The plurality of touch detection sensors are disposed so that the touch detection sensor of (2,1), the touch detection sensor of (2,6), the touch detection sensor of (3,1), the touch detection sensor of (3,6), the touch detection sensor of (5,1), and the touch detection sensor of (5,6) have different heights from the touch detection sensor of (2,2) to the touch detection sensor of (2,5). In FIG. 11, the touch detection sensor of (2,1), the touch detection sensor of (3,6), and the touch detection sensor of (5,1) have a height of ⅓ of the touch detection sensor of (2, 2) and thus are disposed to have a size of ⅓ in an area.

Further, the touch detection sensor of (2,6), the touch detection sensor of (3,1), and the touch detection sensor of (5,6) have a height of ⅔ of the touch detection sensor of (2, 2) and thus are disposed to have a size of ⅔ in an area.

As described in FIG. 10, in the touch screen panel, the touch detection sensors need to be disposed in the whole of the active region, that is, the region in which the screen image is displayed. However, FIG. 10 illustrates five columns and six rows to simplify the arrangement of the touch detection sensors.

In the embodiment of FIG. 11, the touch detection sensors of the first column, the touch detection sensors (height of ⅔) of the second column, and the touch detection sensor (height of ⅓) of the third column may be repeatedly disposed in the column direction and differently from one illustrated in FIG. 11, as the touch detection sensors are repeatedly disposed like the touch detection sensors of the first column→the touch detection sensors of the second column→the touch detection sensors of the third column→the touch detection sensors of the second column→the touch detection sensors of the first column, it is apparent to those skilled in the art that the change in an order thereof is also within the scope of the present invention.

Figure 12:
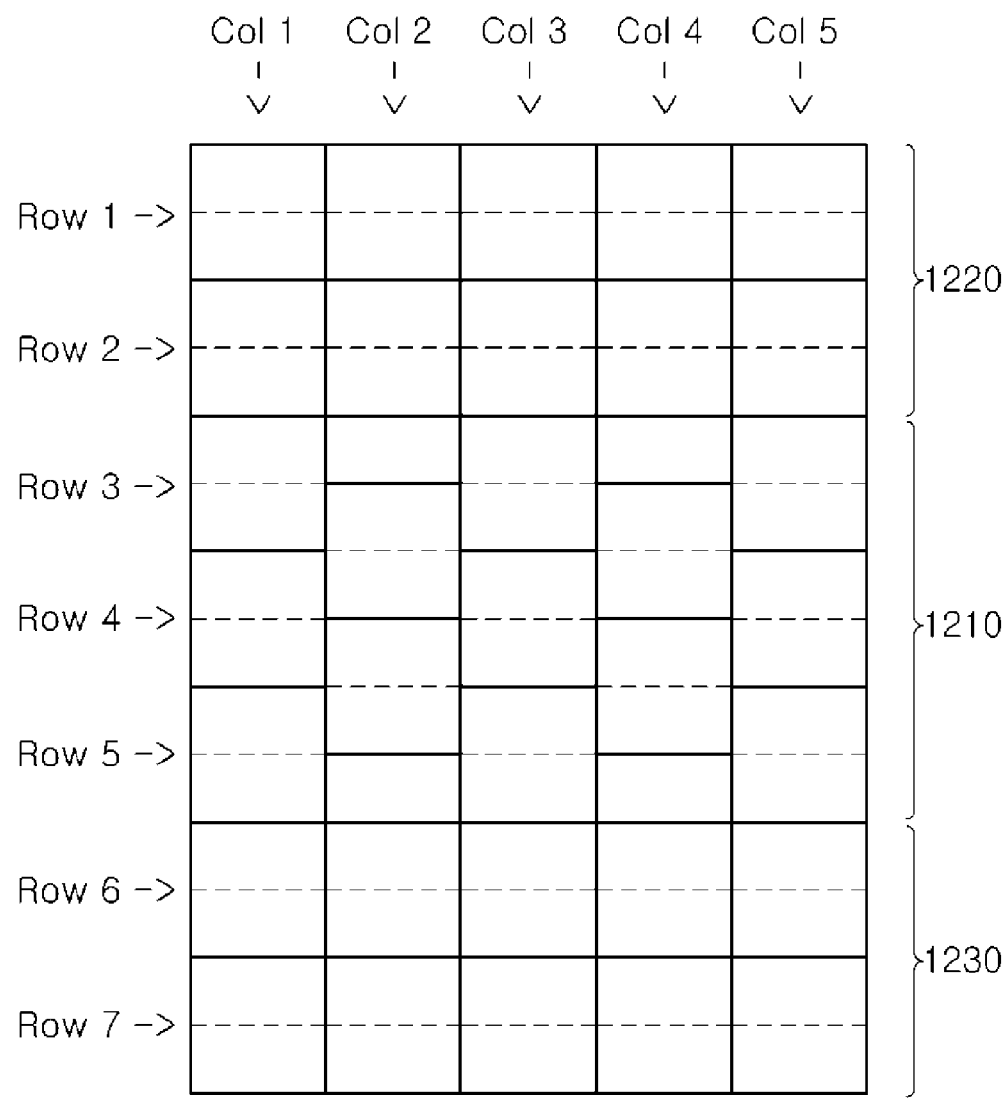
FIG. 12 is a diagram illustrating an embodiment in which stripe structures of upper and lower portions and the delta structure according to an embodiment of the present invention are mixed at a central portion of the panel.

FIG. 12 is a diagram illustrating an embodiment in which stripe structures of upper and lower portions and the delta structure according to an embodiment of the present invention are mixed at a central portion of the panel.

In FIG. 12, a central portion 1210 of the screen panel has the delta structure according to the present invention but an upper portion 1220 and a lower portion 1230 of both sides of the screen panel have the stripe structure. The case in which the stripe structure of the upper portion 1220 and the lower portion 1230 of both sides of the screen panel has two layers is illustrated but it is apparent to those skilled in the art that the stripe structure is not limited thereto and therefore may have one layer and layers exceeding two.

It is apparent to those skilled in the art that a touch detection sensor structure according to another embodiment in which the embodiment of FIG. 10 and the embodiment of FIG. 11 are mixed may be provided.

The touch detection sensor structure includes the plurality of touch detection sensors of the first column, the plurality of touch detection sensors of the second column, the plurality of touch detection sensors of the third column having a predetermined width and a predetermined height and the touch detection sensor of the second column mismatches the touch detection sensor of the first column by a first offset and the touch detection sensor of the third column mismatches the touch detection sensor of the first column by a second offset.

In the touch detection sensor structure disposed to have two offsets, FIG. 10 or FIG. 11 illustrates that the plurality of touch detection sensors having a different height from that of the touch detection sensors of the first column are disposed at both ends of the second column and both ends of the third column.

The first offset is 50% and one of the touch detection sensors of the second column is disposed to mismatch the two successively disposed touch detection sensors of the touch detection sensors of the first column by a half in terms a height or a width to form the delta (Δ) structure.

The second offset is 33.3% and the touch detection sensor of the third column is disposed to mismatch the touch detection sensor of the first column by ⅔ and ⅓ in a height to form the delta (Δ) structure.

In particular, in the case of the second offset, the touch detection sensor of the third column has a height of ⅔ with respect to that of the touch detection sensor of the first column and the touch detection sensor of the fourth column has a height of ⅓ with respect to that of the touch detection sensor of the first column.

FIG. 13 is a diagram illustrating an embodiment in which the delta structure satisfying the separation conditions according to an embodiment of the present invention is disposed in a row direction of the touch screen panel.

The delta structure according to the present invention may be disposed to have the delta structure in the row direction as illustrated in FIG. 13.

The embodiment of FIG. 13 illustrates the embodiment having an offset of 50% but it is apparent to those skilled in the art that the embodiment having an offset of 33.3%, the embodiment in which the embodiment having an offset of 50% and the embodiment having an offset of 33.3% are mixed, and the embodiment in which the stripe structure in FIG. 12 is provided at both ends of the left and right side are within the scope of the present invention.

As set for the above, according to the touch screen panel according to the exemplary embodiments of the present invention, only the optimal conditions of the separation may be extracted based on the arrangement of the touch sensors 10 (that is, the length of the basic sensor need not be small to satisfy the conditions of the separation), such that the number of sensors 10 may be reduced and the area of the touch IC 30 for determining whether the touch is generated may be minimized, thereby more economically manufacturing the touch screen panel.

According to the touch detection sensor structure of a capacitive type touch screen panel according to the exemplary embodiments of the present invention, it is possible to increase the resolution of the multi-touch.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

What is claimed is:

1. A touch detection sensor structure of a touch screen panel including a plurality of touch detection sensors generating a touch capacitance by an approach of a conductor, comprising:
   a plurality of touch detection sensors of a first row or a first column having a predetermined width and a predetermined height; and
   a plurality of touch detection sensors of a second row or a second column having the same width and height as the touch detection sensor of the first row or the first column,
   wherein the touch detection sensors of the second row or the second column are disposed to mismatch the touch detection sensors of the first row or the first column by a predetermined offset, and
   wherein when a plurality of touch capacitances is generated throughout the first column and the second column by two conductors, a multi-touch by the two conductor is detected based on a smaller one of a distance between centers of two touch capacitances generated at two touch locations in the first column and a distance between centers of two touch capacitances generated at two touch locations in the second column to increase a detection resolution of a touch coordinate.

2. The touch detection sensor structure of claim 1, wherein both ends of the second row or the second column are provided with a plurality of touch detection sensors having a different width from the width of the touch detection sensors of the first row or the first column or a different height from the height of the touch detection sensors of the first row or the first column.

3. The touch detection sensor structure of claim 1, wherein the offset is 50% and one of the touch detection sensors of the second row or the second column mismatches two successively disposed touch detection sensors of the touch detection sensors of the first row or the first column by a half in terms of a height or a width to form a delta (Δ) structure.

4. The touch detection sensor structure of claim 3, wherein when a plurality of touch capacitances is generated throughout the first row and the second row by the two conductors, a multi-touch by the two conductors is detected based on a smaller one of a distance between centers of two touch capacitances generated at two touch locations in the first row and a distance between centers of two touch capacitances generated at two touch locations in the second row to increase a detection resolution of a touch coordinate.

5. The touch detection sensor structure of claim 1, wherein the offset is 33.3% and one of the touch detection sensors of the second row or the second column mismatches two successively disposed touch detection sensors of the touch detection sensors of the first row or the first column by ⅓ and ⅔ or ⅔ and ⅓ in a height or a width to form a delta (Δ) structure.

6. The touch detection sensor structure of claim 1, wherein upper and lower edges or left and right edges of the touch screen panel are further provided with the touch detection sensors having a stripe structure without the offset by at least one column or at least one row.

7. The touch detection sensor structure of claim 1, wherein the touch detection sensors of the first row or the first column and the touch detection sensors of the second row or the second column are repeatedly disposed in a column direction or a row direction and as the touch detection sensors are repeatedly disposed, an order of the touch detection sensors is changed.

8. A touch detection sensor structure of a touch screen panel including a plurality of touch detection sensors generating a touch capacitance by an approach of a conductor, comprising:
a plurality of touch detection sensors of a first row or a first column having a predetermined width and a predetermined height;
a plurality of touch detection sensors of a second row or a second column having the same width and height as the touch detection sensor of the first row or the first column; and
a plurality of touch detection sensors of a third row or a third column having the same width and height as the touch detection sensor of the first row or the first column,
wherein the touch detection sensors of the second row or the second column are disposed to mismatch the touch detection sensors of the first row or the first column by a first offset and the touch detection sensors of the third row or the third column are disposed to mismatch the touch detection sensors of the first row or the first column by a second offset, and
wherein when a plurality of touch capacitances is generated throughout the first column and the second column by two conductors, a multi-touch by two conductors is detected based on a smaller one of a distance between centers of two touch capacitances generated at two touch locations in the first column and a distance between centers of two touch capacitances generated at two touch locations in the second column to increase a detection resolution of a touch coordinate.

9. The touch detection sensor structure of claim 8, wherein both ends of the second row or the second column and both ends of the third row or the third column are provided with a plurality of touch detection sensors having a different width from the width of the touch detection sensors of the first row/the third row or the first column/the third column or a different height from the height of the touch detection sensors of the first row/the third row or the first column/the third column.

10. The touch detection sensor structure of claim 8, wherein the first offset is 50% and one of the touch detection sensors of the second row or the second column mismatches two successively disposed touch detection sensors of the touch detection sensors of the first row or the first column by half in a height or a width to form a delta (Δ) structure.

11. The touch detection sensor structure of claim 10, wherein when a plurality of touch capacitances is generated throughout the first row and the second row by two conductors, a multi-touch by two conductors is detected based on a smaller one of a distance between centers of two touch capacitances generated at two touch locations in the first row and a distance between centers of two touch capacitances generated at two touch locations in the second row to increase a detection resolution of a touch coordinate.

12. The touch detection sensor structure of claim 8, wherein the second offset is 33.3% and one of the touch detection sensors of the third row or the third column mismatches two successively disposed touch detection sensors of the touch detection sensors of the first row or the first column by ⅓ and ⅔ or ⅔ and ⅓ in a height or a width to form a delta (Δ) structure.

13. The touch detection sensor structure of claim 12, wherein when a plurality of touch capacitances are generated throughout the second row and the third row by two conductors, a multi-touch by two conductors is detected based on a smaller one of a distance between centers of two touch capacitances generated at two touch locations in the second row and a distance between centers of two touch capacitances generated at two touch locations in the third row to increase a detection resolution of a touch coordinate.

14. The touch detection sensor structure of claim 12, wherein when a plurality of touch capacitances are generated throughout the second column and the third column by two conductors, a multi-touch by two conductors is detected based on a smaller one of a distance between centers of two touch capacitances generated at two touch locations in the second column and a distance between centers of two touch capacitances generated at two touch locations in the third column to increase a detection resolution of a touch coordinate.

15. The touch detection sensor structure of claim 8, wherein upper and lower edges or left and right edges of the touch screen panel are further provided with the touch detection sensors having a stripe structure without the offset by at least one column or at least one row.

16. The touch detection sensor structure of claim 8, wherein the touch detection sensors of the first row or the first column, the touch detection sensors of the second row or the second column, and the touch detection sensors of the third row or the third column are repeatedly disposed in a column direction or a row direction and as the touch detection sensors are repeatedly disposed, an order of the touch detection sensors is changed.

* * * * *